United States Patent [19]
Desjoyaux et al.

[11] Patent Number: 5,879,547
[45] Date of Patent: Mar. 9, 1999

[54] FILTER PANEL FOR SWIMMING POOL

[75] Inventors: Jean Louis Desjoyaux, L'Etrat; Pierre Louis Desjoyaux, La Fouillouse; Catherine Jandros, L'Etrat, all of France

[73] Assignee: Piscines Desjoyaux S.A., France

[21] Appl. No.: 836,180

[22] PCT Filed: Oct. 13, 1995

[86] PCT No.: PCT/FR95/01341

§ 371 Date: Jul. 7, 1997

§ 102(e) Date: Jul. 7, 1997

[87] PCT Pub. No.: WO96/12075

PCT Pub. Date: Apr. 25, 1996

[30] Foreign Application Priority Data

Oct. 17, 1994 [FR] France .................................. 94 12773

[51] Int. Cl.[6] .................................................. B01D 17/00
[52] U.S. Cl. .................... 210/169; 210/195.1; 210/416.2
[58] Field of Search ................................ 210/169, 195.1, 210/416.2

[56] References Cited

U.S. PATENT DOCUMENTS

| 2,980,256 | 4/1961 | Nash . |
| 3,532,217 | 10/1970 | Richards . |
| 5,178,523 | 1/1993 | Cheng-Chung ................... 417/423.3 |

FOREIGN PATENT DOCUMENTS

| 2682981 | 4/1993 | France . |
| 8901556 | 2/1989 | WIPO . |
| 9112394 | 8/1991 | WIPO . |

*Primary Examiner*—Jay H. Woo
*Assistant Examiner*—Betsey J. Morrison
*Attorney, Agent, or Firm*—Wall Marjama Bilinski & Burr

[57] ABSTRACT

Apparatus for filtering swimming pool water that includes a housing having a front wall that forms an integral part of the pool's side wall. The housing has a front compartment that is filled with pool water and a water filter and rear compartment containing a pump. The compartments are separated by a water-tight partition. The pump is arranged to draw inlet water through the filter and discharge it back into the pool.

10 Claims, 3 Drawing Sheets

FILTER PANEL FOR SWIMMING POOL

BACKGROUND OF THE INVENTION

The invention relates, in particular, to the filtering of water in swimming pools.

Generally speaking, filtration is obtained by means of one or more filters, which may have various structures, with the filters being fitted in combination with a water suction and delivery system. Various solutions can be used to fulfil this function.

For example, all the pumping and filtration equipment can be situated in a plant room located outside the pool. Such facilities can also be integrated in a compact unit and fitted in combination with the panels of the swimming pool.

Finally, as disclosed by Patent FR 2682981 of which the present Applicant is the holder, the means of pumping and filtration can be integrated in a panel that can be fitted in combination with the other panels that make up the swimming pool. This filtration panel is obtained by injection moulding of plastics. The means of pumping and filtration are fitted in two juxtaposed compartments arranged side by side.

SUMMARY OF THE INVENTION

Starting from this design, the aim was to improve the characteristics of the filtration panel in terms of its technical design, its structure, its features and its method of manufacture, which was to be simplified in order to reduce costs significantly.

The aim was also to improve the sealing and simplify the integration of a floodlight.

In order to solve this problem, a filtration panel was designed and developed which comprises a compact unit having two independent internal compartments and distinctive by virtue of the fact that:

the unit is obtained by rotational moulding, the two compartments are of different height and are arranged one behind the other, the tallest compartment is designed to be filled with water and has means of filtering, the compartment is situated directly on the front surface of the unit, the front surface of the unit has a surface reinforcement element, the tallest compartment is sealed and is separated from the other compartment by a partition, the compartment has means of pumping, suction and delivery pipes are mounted in combination with the means of filtering and pass through a sealed bulkhead in the vertical separating partition, the two compartments are each shut off by a removable cover which tops the entire unit.

This combination of characteristics makes it possible to obtain a filtration panel for swimming pools by using the rotational moulding technique.

Still with the aim of increasing its rigidity, the panel has a bracing strut between its front and its rear.

In order to solve the problem of increasing the filtration capacity, the means of filtering consists of two filter cartridges arranged vertically in combination with a locating plate, said cartridges allowing the natural flow of water from the top to the bottom.

The suction and delivery pipes rest on support cradles provided on the separating partition in combination with compression seals and a thermoformed plate.

Another problem that the invention aims to solve is to simplify the installation and adaptation of one or more floodlights.

This problem is solved by the fact that the front surface of the panel has integral features, made during the rotational moulding process, to position at least one floodlight.

BRIEF DESCRIPTION OF THE DRAWINGS

The invention is described below in more detail, reference being made to the accompanying drawings in which.

DESCRIPTION OF THE INVENTION

According to the invention, the panel comprises a body (1) obtained by rotational moulding which is shaped to form a compact unit having two independent internal compartments (1a) and (1b) separated by a vertical partition (1c).

It is pointed out that rotational moulding involves, as is well known to those skilled in the art, moulding a hollow component made of plastic, especially polyethylene, by rotation.

Figure 1:
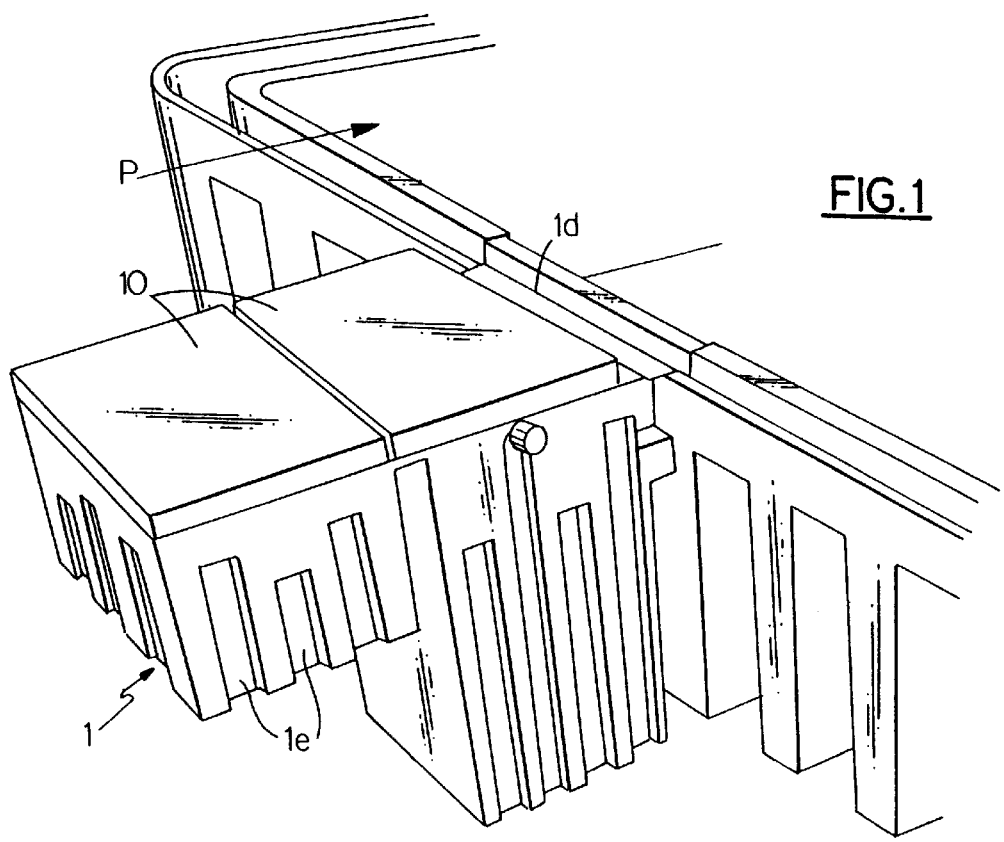
FIG. 1 is a perspective view of a swimming pool equipped with a filtration panel according to the invention.
Figure 2:
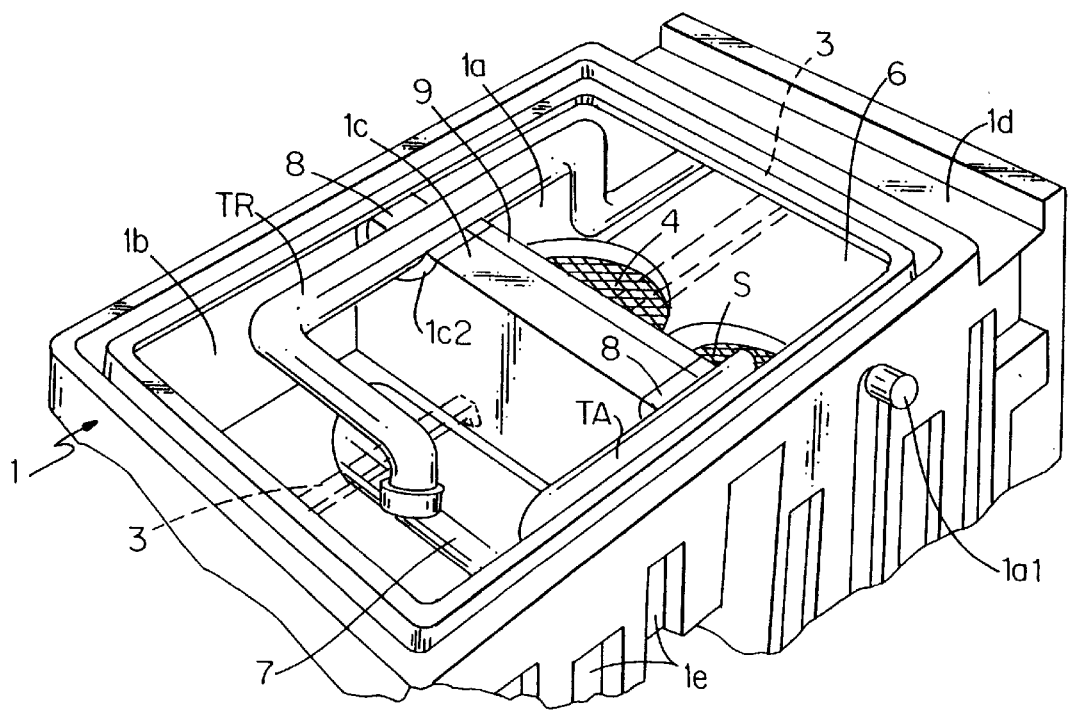
FIG. 2 is a perspective view of the inside of the filtration panel.
Figure 3:
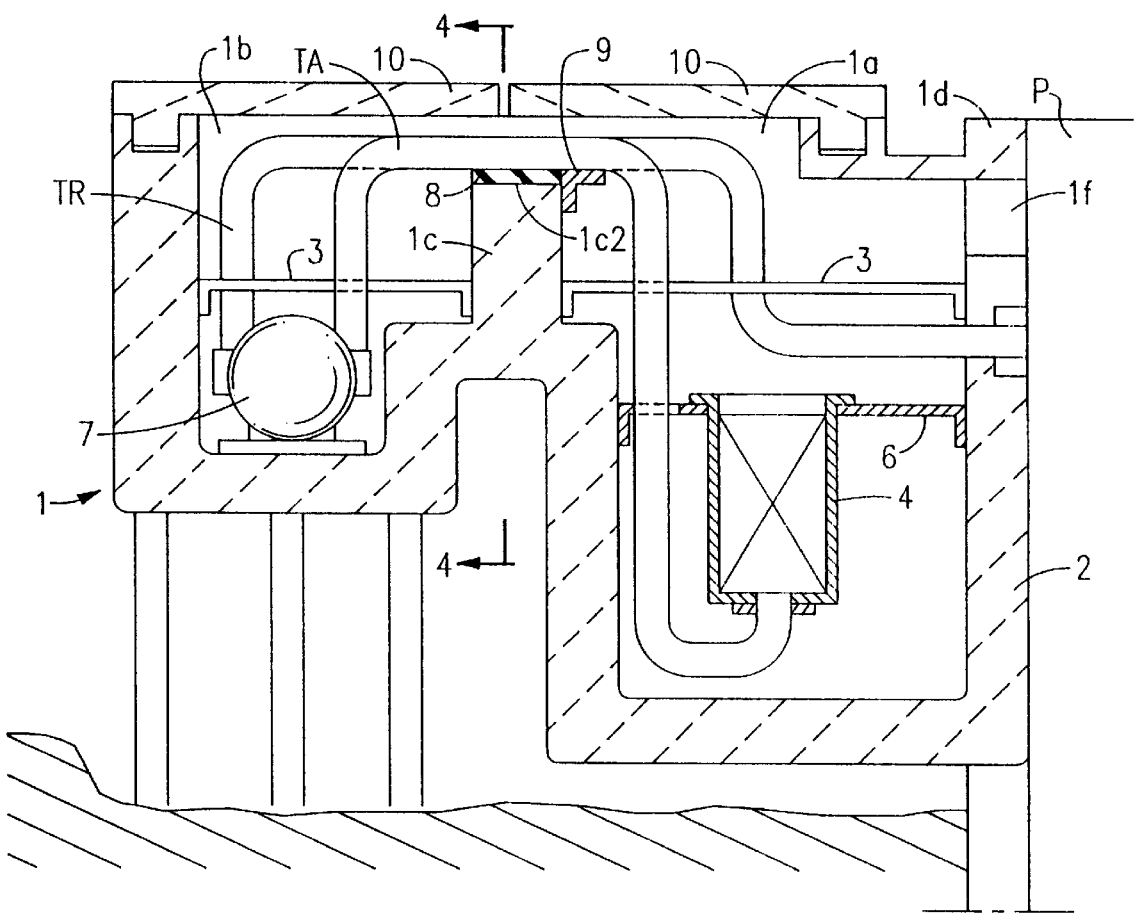
FIG. 3 is a longitudinal sectional view of the unit.

More particularly and as shown in FIG. 2, the two compartments (1a) and (1b) are of different height and are arranged one behind the other. The taller compartment (1a) is designed to be filled with water and has means of filtering. This compartment (1a) is therefore situated immediately at the level of the front surface (1d) of the unit and is intended to be positioned so that it is in line with the other panels that make up the pool (P), as will be stated in the remainder of the description.

The front surface of the unit (1) which constitutes the filtration panel has a surface reinforcement element (2) in the form of a plate, for instance. This element is necessary in order to take into account the force exerted by the water when the pool is filled if compartment (1a) is not itself filled.

It is pointed out that the front surface (1d) of the panel in fact has a reduced thickness given the rotational moulding process.

Note that the other sides of the unit can have stiffening ribs (1e).

Similarly, still with the aim of increasing rigidity, the entire unit has a bracing strut (3) between the front surface and the rear surface.

The means of filtering consists of two filter cartridges (4) and (5) of any known, appropriate type arranged vertically in combination with a locating plate (6) fitted in compartment (1a). These filter cartridges (4) and (5) allow the natural flow of water from the top to the bottom. The front surface (1d) of the panel has an opening (1f) so that the top of internal compartment (1a) opens out into the pool.

The design of filter cartridges (4) and (5) is not described in detail because there can be various production models. In particular, the cartridges are of the type defined in Patent FR 2652758.

Compartment (1b) is sealed and separated from the filtration compartment (1a) by partition (1c) and has means of pump (7) that can have various embodiments. For example, this means may consist of a dual-speed pump or two independent single-speed pumps linked in pairs, thus making it possible to achieve the recycling flow rates required by Ministerial Decree if the swimming pool is used by the public. In this application the panel is combined with any feature and accessory currently used such as a chlorine metering device, water meter, etc. in order to satisfy the applicable regulations.

Figure 4:
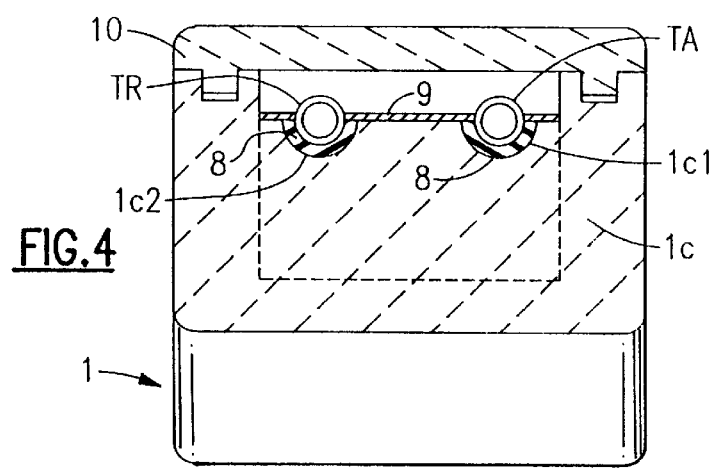
FIG. 4 is a cross sectional view along line 4.4 in FIG. 3.

The suction (TA) and delivery (TR) pipes are installed in combination with the means of filtering and pass through a sealed bulkhead in the vertical separating partition (1c). For this purpose, pipes (TA) and (TR) rest on cradle supports (1c1) (1c2) provided on the partition in combination with compression seals (8) and a thermoformed plate (9) attached to said partition (1c) (FIG. 4). Also note that plate (9) is shaped to act as an anti-overflow device, thus preventing water contained in compartment (1a) from accidentally entering sealed compartment (1b) which accommodates the pump.

The separating partition (1c), on the same side as sealed compartment (1b), is used to attach various electrical connection accessories in particular.

The side walls of compartment (1a) have recesses (1a1) for the flow and circulation of air. Similarly, the bottom of sealed compartment (1b) may have a drain opening in case of accidental leaks in that compartment.

Given the design of the filtration panel according to the invention, especially its manufacturing process (rotational moulding) and given the fact that compartment (1b) which accommodates the means of pumping is situated at the rear, it is easy to install a floodlight at the level of the front surface of the panel, i.e. the surface that communicates with compartment (1a) which accommodates the means of filtering and is filled with water. In this case it is no longer necessary to provide additional means of sealing because the floodlight is directly linked to the filtration compartment. It is sufficient to select a floodlight that is designed so that it is fully sealed.

The floodlight is fixed to the corresponding surface of the panel by any known, appropriate means.

The two compartments (1a) and (1b) are each shut off by a removable cover (10) that tops the panel/unit assembly (1).

The front surface (1d) of the panel has lateral wings that have features to attach the entire panel (1) to the other panels (P) that make up the swimming pool without compromising sealing. Similarly, rear compartment (1b) cooperates with a concrete block in order to absorb the various forces exerted.

Provision is also made to circulate water directly, in combination with the filtration devices, through the top of the panel so that the pool water flows through said filtration devices by gravity in order to obtain so-called overflow filtration.

Such overflow filtration can take place in various alternative ways given the design of the panel as described.

Figure 5:
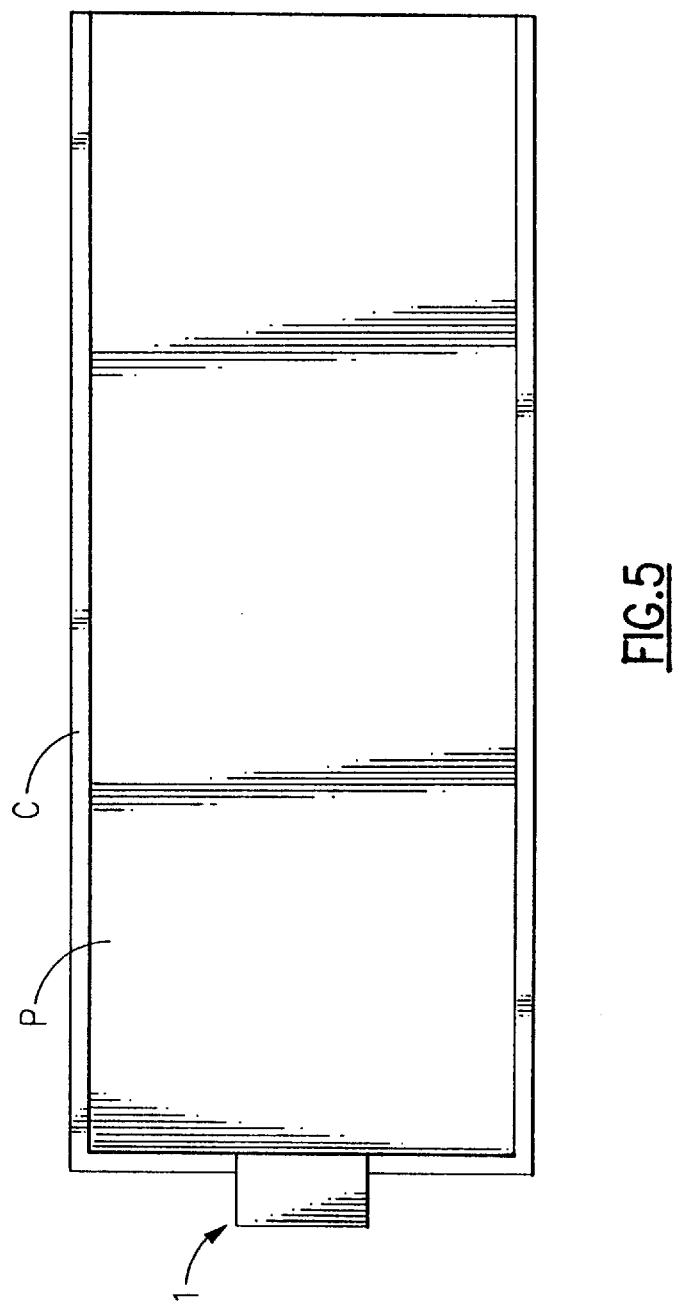
FIG. 5 is a schematic view of a pool equipped with the present invention.

Overflow can take place through a peripheral trough that can be embedded in the reinforcement of the pool with the trough opening out into the top of the panel. The trough can be produced simply in the form of a gutter with an overflow grating or a PVC pipe can be embedded in the reinforcement and can open out, at various intervals, into holes situated directly on the upper part of the reinforcement into which the water from the pool can overflow. Obviously, the collecting pipe opens out into the top of the panel. In this case overflow takes place directly into the reinforcement. See FIG. 5 which shows, in a purely schematic manner, a pool equipped with filtration panel (1) according to the invention in combination with reinforcement (C) devised to obtain filtration by overflow.

Also note that the border that normally surrounds the pool can have a negative slope so that the water that overflows is either returned to the pool with the border being, in this case, pierced by holes so that it opens out into the collecting pipe embedded in the reinforcement.

Filtration by overflow has a particularly advantageous application in the case of swimming pools used by the public. Note that in this case the pump can be installed in an independent room.

The advantages are apparent from the description, the following aspects being emphasised and restated in particular:

manufacture by rotational moulding makes it possible to achieve improved sealing,
  reduced manufacturing costs,
  easy integration of a floodlight,
  increased internal volume making it possible to increase the filtration capacity,
  possibility of using a dual-speed pump or two independent single-speed pumps linked in pairs,
  possibility of combining the filtration panel with various features of the pool in order to obtain so-called overflow filtration,
  an application of the filtration panel in the case of pools used by the public.

We claim:

1. Filtration apparatus for a swimming pool that includes
  a housing having a front wall that is integral with one vertically disposed wall of a swimming pool, said housing being formed by rotational molding,
  said housing having a front compartment adjacent said front wall and a rear compartment behind said front compartment, said front compartment being deeper than said rear compartment,
  a sealed partition separating the two compartments,
  said front compartment having inlet means for filling the compartment with water from said pool and having filtering means mounted in the bottom of said compartment,
  a pump mounted in said rear compartment having a suction pipe for drawing water from said filtering means into said pump and a discharge pipe for delivering filtered water back into said pool.

2. The apparatus of claim 1 wherein said housing further includes a cover.

3. The apparatus of claim 1 wherein said housing further includes a reinforcing means extending from the front wall of the housing to a housing rear wall.

4. The apparatus of claim 1 wherein said filtering means includes a pair of filter cartridges vertically disposed within a locating plate mounted in the bottom of the front compartment.

5. The apparatus of claim 1 that further includes a pipe cradle mounted in said partition for supporting the inlet and discharge pipes; said cradle containing a compression seal and an anti-overflow means for preventing water from moving between compartments.

6. The apparatus of claim 1 that further includes a floodlight mounted in the front wall of the housing.

7. The apparatus of claim 1 wherein said front compartment has an opening therein that opens to the pool.

8. The apparatus of claim 1 wherein said rear compartment contains a drain means.

9. The apparatus of claim 1 wherein said housing has attaching means for joining the housing to vertically disposed pool panels.

10. The apparatus of claim 1 that further includes means for delivering overflow water from said pool into said front compartment.

* * * * *